(No Model.) 2 Sheets—Sheet 1.

G. M. SNODGRASS.
COMBINED STALK CUTTER, ROOT PULLER, AND CULTIVATOR.

No. 511,657. Patented Dec. 26, 1893.

Witnesses
Robt. E. Burtt
J. A. Saul

Inventor:
George M. Snodgrass.
By James L. Norris
Atty.

(No Model.) 2 Sheets—Sheet 2.

G. M. SNODGRASS.
COMBINED STALK CUTTER, ROOT PULLER, AND CULTIVATOR.

No. 511,657. Patented Dec. 26, 1893.

Witnesses
Robert Everett
J. A. Saul

Inventor
George M. Snodgrass.
By James L. Norris
Atty.

THE NATIONAL LITHOGRAPHING COMPANY,
WASHINGTON, D. C.

UNITED STATES PATENT OFFICE.

GEORGE MELVIN SNODGRASS, OF WACO, TEXAS, ASSIGNOR OF ONE-FOURTH TO VAN HALL, OF SAME PLACE.

COMBINED STALK-CUTTER, ROOT-PULLER, AND CULTIVATOR.

SPECIFICATION forming part of Letters Patent No. 511,657, dated December 26, 1893.

Application filed September 7, 1893. Serial No. 485,003. (No model.)

*To all whom it may concern:*

Be it known that I, GEORGE MELVIN SNODGRASS, a citizen of the United States, residing at Waco, in the county of McLennan and State of Texas, have invented new and useful Improvements in a Combined Stalk-Cutter, Root-Puller, and Cultivator, of which the following is a specification.

This invention has for its object to provide a combined stalk cutter, root puller and cultivator and it consists in the features of construction and novel combinations of devices in a machine adapted for different kinds of agricultural work, as hereinafter more particularly described and claimed.

Figure 1:
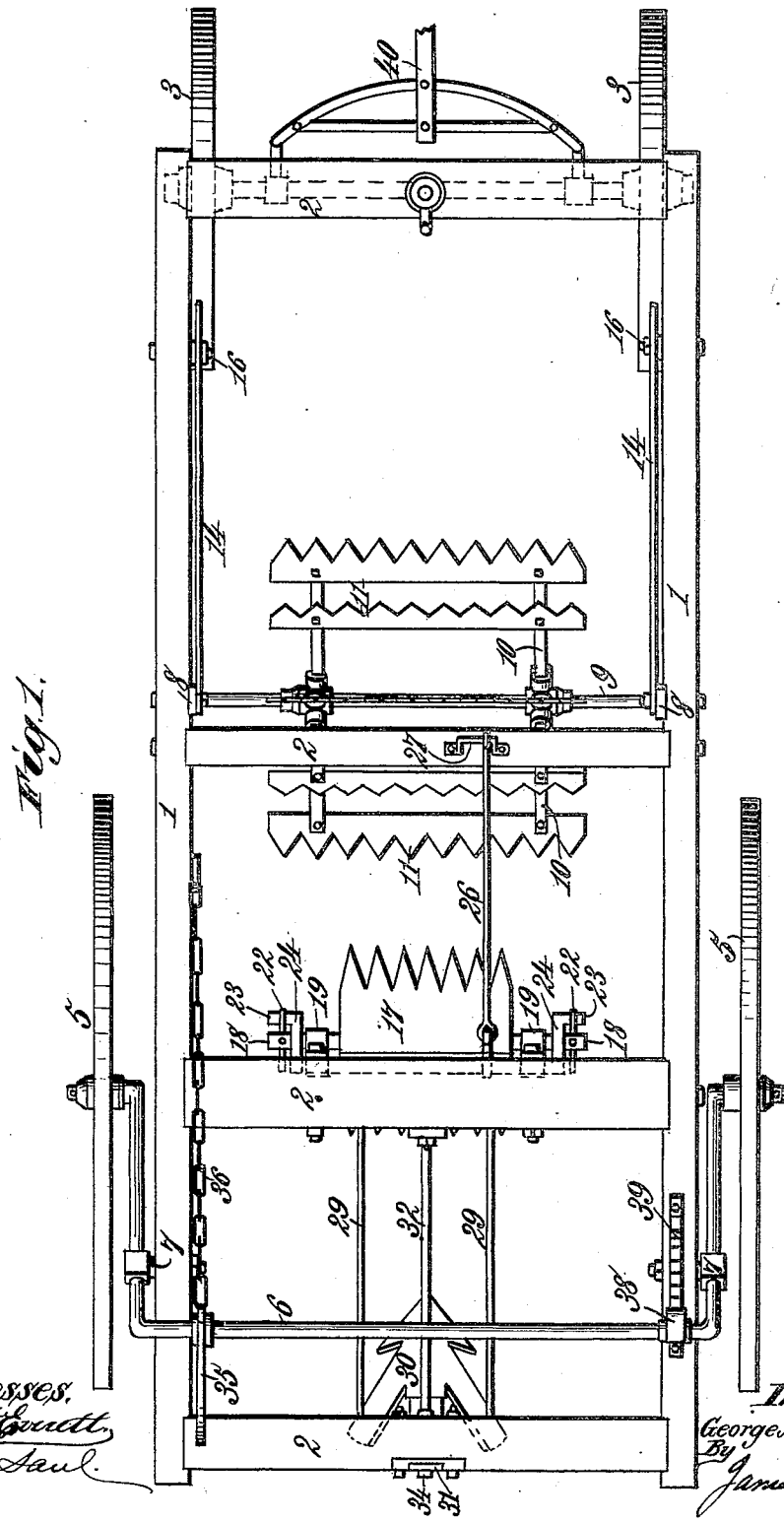
Figure 2:
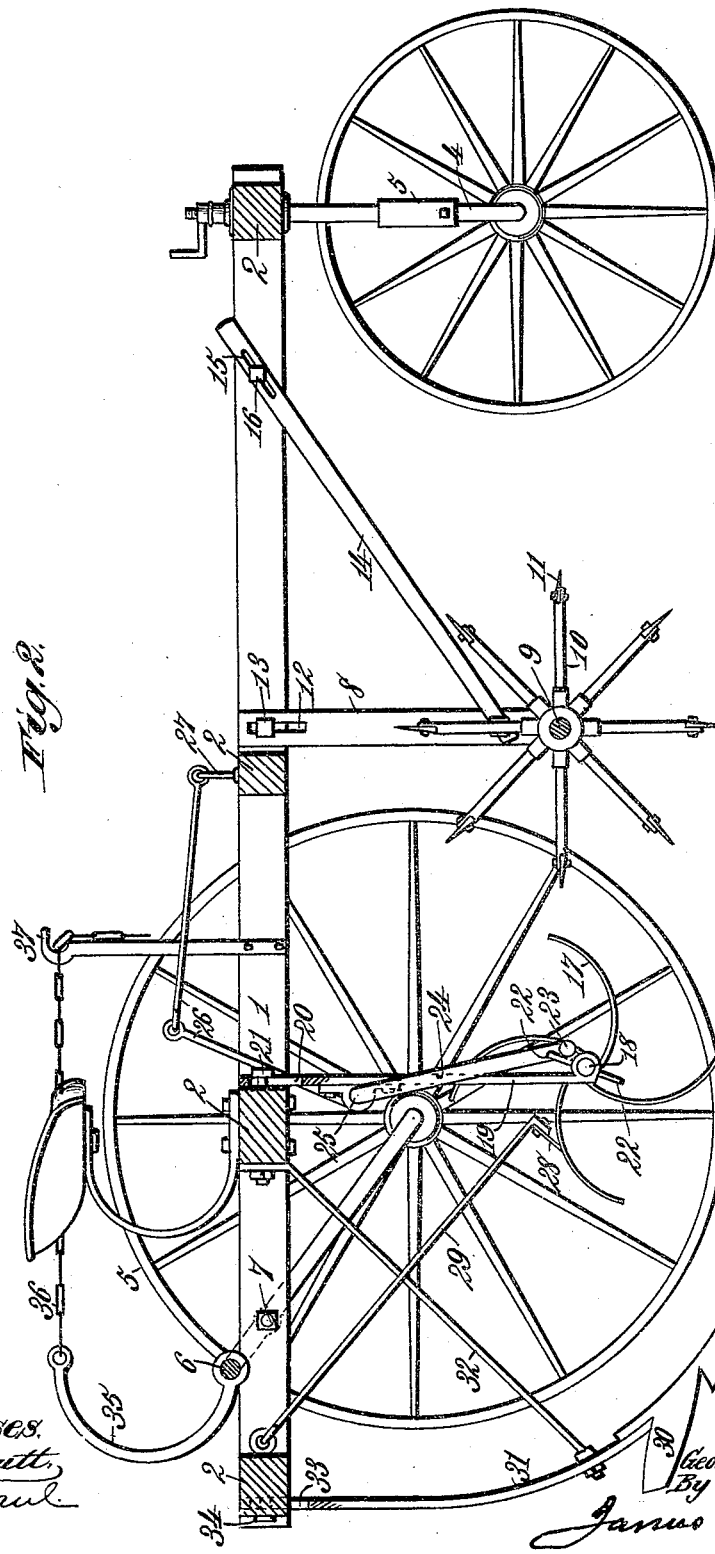

In the annexed drawings illustrating the invention—Figure 1 is a plan of a cultivating machine embodying my improvements and comprising a rotary stalk cutter, a root puller and a double turning plow for bedding the ground. Fig. 2 is a sectional side elevation of the machine.

Referring to the drawings, the numeral 1 designates the side rails and 2 the connecting cross-bars of the machine frame which may be constructed wholly or in part of either wood or metal. The forward wheels 3 are attached to the spindles of an arched axle 4 connected with the forward end of the machine frame and arranged beneath the same in such manner that short turns can be readily made. The rear wheels 5 are attached to the spindles of an adjustable arched axle 6 the vertical arms of which axle are supported on pivots 7 attached to the side rails 1 of the machine frame.

Attached to the machine frame at a convenient point between the forward and rear axles are vertically adjustable hangers 8 the lower ends of which are arranged to support the axle 9 of a rotary stalk cutter. This stalk cutter comprises radial arms 10 secured to the axle 9 and cutting blades 11 fastened transversely to the outer ends of said arms. I prefer to provide two sets of radial arms 10 so as to afford a firm support for the cutting blades. The blades 11 are made of steel and have teeth similar to those of a saw, sharp on their sides and points, and being thus provided with sharp serrated edges the cutting blades will do their work with less than one half the pressure that would otherwise be required. In the upper ends of the hangers 8 are vertical slots 12 for the passage of bolts 13 by which said hangers are adjustably attached to the side rails 1 of the machine frame in such manner as to permit any required vertical adjustment of the rotary stalk cutter. Each hanger 8 is provided with a forward and upward extended brace 14 having its upper end provided with a slot 15 through which is passed a bolt 16 for adjustably attaching said brace to the side rail of the machine frame. The vertically adjustable hangers 8 enable the blades 11 of the rotary stalk cutter to be thrust into the ground any desired depth. During a forward movement of the machine the cutting blades, being thus arranged to penetrate the soil, will be caused to revolve and force themselves through the stalks so as to cut them to pieces.

In rear of the rotary stalk cutter is arranged a root puller comprising a series of curved steel blades 17 having deeply serrated edges and secured to an axle 18 that is journaled in the lower ends of hangers 19 depending from the machine frame. The upper ends of the hangers 19 are provided with vertical slots 20 for passage of bolts 21 by which the hangers are attached, preferably, to the front of one of the cross-bars 2 and made vertically adjustable for raising and lowering the root puller and adjusting it to any desired depth of penetration into the soil. The axle 18 of the root puller is provided at its ends with stop pins 22 that are adapted to come in contact with lateral projections 23 on brake-levers 24 carried by a rock-shaft 25 journaled in suitable bearings on the rear faces of the hangers 19 that support the root puller. The levers 24 occupy a normally depending position parallel with each other and have their projections 23 in the path of the pins 22 on the axle of the root puller. The axle and attached blades or grabs 17 of the root puller tend to revolve with the forward movement of the machine, the said blades being successively engaged in the soil, but this motion of the root puller is checked by engagement of the stop pins 22 against the projections 23 of the brake levers 24 and thus the root puller is held from rotation until it has gathered a sufficient accumulation of roots to be discharged. To the rock-shaft 25 is connected one end of a jointed lever 26 the other end of which is fulcrumed to a support 27 on the machine frame. By depressing this lever 26 the rock shaft 25, will be oscillated or rocked in such direction as to throw the brake-levers 24 forward and upward and thereby carry their projections 23 beyond the path of the stop-pins 22 and thus permit rotation of the root pulling grabs or blades 17 to discharge the roots that have been extracted and collected by said blades. A scraper 28 is supported by rods 29 at the rear of the root-puller in position to bear on the rear convexly curved faces of the serrated blades 17 and remove or scrape off any roots that may adhere to the blades of the puller.

At the rear of the machine is a centrally arranged double turning plow 30 carried by a standard 31 having a brace 32 adjustably connected with the machine frame, both the standard and the brace being provided with slots 33 for passage of bolts 34 by which the plow can be adjustably secured at any desired depth of penetration into the soil. When the stalks are cut and the roots extracted, as already described, the double turning plow 30 throws out the soil each way, thus forming beds for the planting of another crop. The stalk cutter, root puller and bedding plow being quickly adjustable to any desired depth in the ground enables the machine to be readily adapted to various kinds of work. The manner in which the several operating devices are connected with the frame renders them, also, capable of being easily detached and replaced by other cultivating implements, if desired.

It will be observed that the rear arched axle 6 is extended above the machine frame so as to permit raising or lowering of the frame, as may be required, to place the several operating devices in contact with the ground or to elevate them to a height where they will be inoperative and out of the way in transporting the machine. Adjustment of the rear arched axle 6, to raise or lower the machine frame, is accomplished by means of a curved lever 35 rigidly secured to the horizontal portion of the axle and a chain 36 attached to the upper end of said lever and extended forward to a hooked standard 37 on the machine frame. By drawing the chain 36 and lever 35 forward the rear arched axle 6 will be brought into a vertical, or approximately vertical, position with the effect of elevating the machine frame and raising the stalk cutting, root pulling and cultivating devices from the ground, while by allowing the axle and attached lever and chain to swing backward said cultivating mechanism will be lowered, with the machine frame, into operative position. The chain 36 can be engaged, at any one of its links, with the hooked standard 37 by simply slipping one of the chain links over said standard so as to support the frame in the position to which it may be adjusted. If desired the rear arched axle 6 may be provided with a pawl-lever 38 to engage a rack 39 on the machine frame to assist in retaining the frame and axle in the required relative position and prevent the axle from swinging forward when the frame is elevated to its highest position.

The machine may be provided with any suitable draft devices 40 and is easily turned short around by reason of the manner in which the forward end of the frame is mounted upon the forward arched axle.

The relative arrangement of the stalk cutter and root puller is such that the former is easily held down into the ground by the engagement of the root puller in the soil. The plow also assists in holding the stalk cutter and the root puller in operative position. In extracting roots the serrated blades or grabs of the root puller also plow a furrow and by the combined action of the several devices the stalks are cut down, roots extracted and the land plowed and prepared for planting, with ease and rapidity.

What I claim as my invention is—

1. In a cultivating machine, the combination with a rotary stalk cutter, of a root puller mounted on a horizontal axis to revolve in a vertical plane and arranged at the rear of the stalk-cutter, and brake mechanism for checking the rotation of the root-puller for extracting and collecting roots, substantially as described.

2. In a cultivating machine, the combination with a rotary stalk-cutter, of a root-puller composed of curved blades secured to a horizontal axis which revolves in a vertical plane, and brake mechanism adapted to engage parts of the said axle for checking the rotation of the root-puller to extract and collect roots, substantially as described.

3. In a cultivating machine, a root puller comprising an axle, curved blades secured to said axle, stop pins in the ends of the axle, and brake levers having projections adapted to be carried in the path of the pins to check rotation of the axle and attached blades and hold the blades rigid for extracting and collecting roots, substantially as described.

4. In a cultivating machine, the combination with a root puller consisting of an axle having curved blades secured thereto and stop pins in the ends of said axle, of a rock shaft carrying brake levers provided with lateral projections that are normally in the path of the stop pins to check rotation of the root puller axle and blades, and a lever for actuating the rock shaft to swing the brake levers upward and forward and carry said projections beyond the path of the stop-pins, substantially as described.

5. In a cultivating machine, the combination of vertically adjustable hangers, an axle journaled in the lower ends of said hangers, curved blades secured to said axle and provided with serrated edges, stop pins in the ends of the axle, a rock shaft mounted on the vertically adjustable hangers and provided with brake levers normally projecting in the path of the stop pins to check rotation of the axle and attached blades and hold them rigidly in position for pulling roots, and a lever for actuating the rock shaft to swing the brake levers away from the axle and permit rotation of the root puller to discharge accumulations of roots, substantially as described.

6. In a cultivating machine, the combination with a root puller comprising curved blades mounted on an axle, of a scraper adapted and arranged to bear successively on the rotating blades of the root puller and remove adhering roots, substantially as described.

7. In a cultivating machine, the combination with a rotary stalk cutter and a root puller mounted in rear of the stalk cutter, of a double turning plow mounted in rear of the root puller, substantially as described.

8. In a cultivating machine, the combination with a vertically adjustable frame, of a rotary stalk cutter, a root puller and a plow carried by said frame and each vertically adjustable independent of the frame to vary their depth of penetration into the soil, substantially as described.

In testimony whereof I have hereunto set my hand in presence of two subscribing witnesses.

GEORGE MELVIN SNODGRASS.

Witnesses:
ORLANDO WHEAT,
S. P. BARNARD.